United States Patent Office 2,937,100
Patented May 17, 1960

2,937,100

GLASS COMPOSITIONS AND GLASS-TO-METAL SEALS

Lucy Florence Oldfield, Harrow Weald, England, John Henry Partridge, deceased, late of Pinner, England, by Ethel Partridge and Michael John Anthony Partridge, administrators, Pinner, England, assignors to The General Electric Company Limited, London, England, a British company No Drawing. Application May 13, 1957
Serial No. 658,530

Claims priority, application Great Britain March 17, 1953

6 Claims. (Cl. 106—53)

This invention relates to glasses suitable for sealing directly to metals and alloys which metals and alloys are of the type having either a non-linear thermal expansion characteristic in the temperature range 20° to 550° C. such that over the temperature ranges 20° C. to 350° C., 20° C. to 450° C., 20° C. to 500° C., and 20° C. to 550° C. respectively, the means coefficients of thermal expansion are approximately 4.8, 5.3, 6.2, 7.1×10$^{-6}$ cm./cm./° C., respectively, or a linear thermal expansion characteristic in the range 20° C. to 550° C. such that the mean coefficient of thermal expansion over this temperature range is in the range 5.3 to 5.7×10$^{-6}$ cm./cm./° C. The invention also relates to glass-to-metal seals obtained by sealing these glasses to such metals and alloys. Glass-to-metal seals of the kind with which the invention is concerned may be used, for example, in the manufacture of certain electrical devices, for sealing a glass part of the envelope of the device to a metal part, or for sealing metal conducting members through a glass wall of the envelope. Alloys having the non-linear thermal expansion characteristics referred to above include, for example, alloys of the kind composed of the metals iron, nickel and cobalt, in the approximate proportions of 54% iron, 29% nickel and 17% cobalt. A metal having a linear thermal expansion characteristic of the kind referred to is molybdenum.

For forming satisfactory glass-to-metal seals, the thermal expansion characteristics of the glass and the metal or alloy used must substantially match, that is to say, the thermal expansion curves of the glass and metal should not be very different from each other; the extent to which the thermal expansion curves can differ in any particular case will, of course, depend on the design of the seal and the purpose for which it is required.

It has previously been proposed to use glasses of high boric oxide and low alkali and alumina contents, that is to say, containing at least 22% boric oxide, less than 10% total alkali metal oxides, and about 2% alumina for sealing to metals of the types specified, since these glasses have the required thermal expansion characteristics. These glasses, however, are liable to present certain difficulties in manufacture as a result of the high boric oxide content; the boric oxide is liable to volatilise to some extent during the glass founding operation, resulting in the production of glasses of different physical characteristics from different batches of the same initial composition. Further, the high boric oxide glasses are not amenable to the fabrication of bulbs and tubing of large sizes, because they tend to develop cord, which is difficult to remove, during founding. These glasses also suffer from the disadvantage that they are susceptible to attack by acids which may be used for washing glass-to-metal seals in manufacture, and that under conditions of high humidity their surfaces are liable to become electrically conducting, due to the formation of a film of an electrolyte solution. It has been found that the resistance to weathering of glasses of this type can be improved by increasing the alumina content, but this results in an increase in the difficulty of founding the glass. If, in order to overcome these defects, the boric oxide content of the glass is reduced, the relative proportions of the remaining constituents being simultaneously increased, the coefficient of thermal expansion of the resulting glass is too high for forming satisfactory seals to iron-nickel-cobalt alloys of the kind referred to above.

It is an object of the present invention to provide a range of glasses which are suitable for sealing to metals and alloys of the type referred to, and which are less subject to the disadvantages mentioned in the preceding paragraph.

The discovery underlying this invention is that this object can be achieved by simultaneously reducing the boric oxide content and increasing the alumina content of the glass composition, as compared with the high boric oxide glasses mentioned above, and introducing fluorine, barium oxide, and optionally lead oxide and/or zinc oxide.

According to the present invention, therefore, a glass suitable for sealing directly to a metal or alloy of the type specified has a composition in the range of 64% to 68% silica ($SiO_2$), 3.5% to 6% alumina ($Al_2O_3$), 12% to 16.5% boric oxide ($B_2O_3$), 3% to 5% sodium oxide ($Na_2O$), 2% to 5% potassium oxide ($K_2O$), 0% to 1.5% calcium oxide (CaO), 0% to 2.5% zinc oxide (ZnO), 2.5% to 3.5% barium oxide (BaO), 0% to 7% lead oxide (PbO), and 0.2% to 2% fluorine, the total content of alkali metal oxides ($Na_2O+K_2O$) being from 6% to 8% and the total content of divalent metal oxides being from 4% to 8%.

All proportions referred to in this specification are by weight, and the range of compositions referred to above is inclusive of the end figures quoted for each component.

It is to be noted that the compositions included within the above statement of the invention refer to the composition of the glass after founding. It will be appreciated that an analysis of a glass will in most cases show that its actual composition differs slightly in some respects from the composition calculated from the starting materials used, as a result of changes in composition which may occur during founding due to the loss of part of one or more constituents by volatilisation or to corrosion, by the molten glass, of the refractory material of which the glass-melting pots or tank furnace walls are formed, resulting in the incorporation of small proportions of said material in the glass. It will also be appreciated that, for obtaining glass of a composition as close as possible to the required composition, it will be necessary when preparing the initial batch of raw materials, to take into account such changes in composition which may occur during founding and to adjust the composition of the starting batch accordingly, in conventional manner. Thus, as is well known to occur in glass founding operations part of the contents of fluorine, alkali metal oxides and boric oxide in the batch are liable to be lost by volatilisation at the glass-melting temperatures used in the production of the glasses of the present invention, and therefore it is usually desirable to include in the batch correspondingly larger proportions of these constituents than those included in the nominal composition of the glass which it is desired to produce. Furthermore small amounts of alumina are usually removed from the pot or furnace walls by the molten glass and incorporated in the glass, so that to compensate for this gain in alumina it is necessary to reduce the proportion of the alumina-producing constituent in the batch, in accordance with usual practice in glass manufacture.

For the manufacture of a glass in accordance with the present invention, the batch may be made up of any suitable ingredients commonly used in the glass-making industry for providing the various constituent oxides of the glass. For example, in addition to sand the batch may include sodium nitrate, potassium carbonate, borax and/or boric acid or boric oxide, barium carbonate, and optionally zinc oxide and lead oxide; cryolite may be employed as a source of fluorine and aluminium, or the fluorine may be derived from sodium silicofluoride while the alumina is provided by some other common alumina-containing mineral such as feldspar; alternatively, if calcium oxide is to be included in the final glass composition, calcium fluoride may be employed as the source of fluorine. If desired a small proportion of a known fining agent such as arsenious oxide may be included in the batch: the amount of such material used is usually so small as to be discernible only as a trace in the final product. The latter might also contain trace impurities resulting from impurities in the starting materials used, but these should, of course, never be allowed to be so high as to detract from the desirable properties of the glass.

The proportions of those ingredients of the batch which furnish the alkali metal oxides, boric oxide, alumina and fluorine, may be adjusted as necessary to compensate for losses and gains during founding, as indicated above. The batch adjustments required will depend to some extent upon the temperature at which the glass is founded and upon the nature of the material of which the glass-melting pot or tank employed is formed. By carrying out the founding under carefully controlled temperature conditions, and in a pot or tank composed of material not subject to appreciable corrosion by the molten glass, it is possible to produce a glass having an analytical composition very close to the nominal composition, with little adjustment of the batch composition. The glasses of the invention may be founded under conventional conditions, the temperature employed usually being between 1400° C. and 1500° C., and the founding of each batch being completed in a period of 1½ to 2 days, for quantities of ½ to 1 ton, but of course shorter periods, for example 4 to 6 hours, only are required for small quantities, for example 5 lbs. or less.

The thermal expansion characteristics of the glasses in accordance with the present invention which we have measured have been such that over the temperature ranges 20° C. to 350° C., 20° C. to 450° C., 20° C. to 500° C., and 20° C. to 550° C. respectively, the mean coefficients of thermal expansion were in the ranges 4.7 to 5.3, 5.0 to 5.4, 5.4 to 6.3, and 6.0 to $7.0 \times 10^{-6}$ cm./cm./° C., respectively; such glasses are sufficiently well matched in respect of their thermal expansion characteristics, to the aforesaid iron-nickel-cobalt alloys and to metals such as molybdenum, to be suitable for the manufacture of glass-to-metal seals with these alloys and metals for most purposes. The aforesaid glasses also had high electrical resistivities, of the order of $10^{11}$ to $10^{12}$ ohm-cm. at 150° C., which is an advantageous property in glasses to be used for glass-to-metal seals in the manufacture of electrical devices.

The glasses according to the invention possess various advantages as a result of the substantial reduction in boric oxide content. They are founded more easily to produce glasses which can readily be fabricated into ware of good quality from the point of view of homogeneity of the glass, which may be obtained substantially free from "cord," "stones" and other defects. The reduction in the boric oxide content also results in a decrease in the effect of humidity and attack by the dilute mineral acids which are generally used for washing glass-to-metal seals in cases where the metal is welded after sealing. The increase in the alumina content also increases the resistance to weathering and to acids. The introduction of fluorine, barium oxide and lead oxide not only counteracts the effect of the reduction of the boric oxide content on the coefficient of thermal expansion of the glass, but these additions also soften the glass, thus facilitating sealing to metal, and reduce the high temperature viscosity of the glass, hence enabling founding to take place more rapidly, with more rapid removal of "seed" or gas bubbles. The presence of lead oxide is not objectionable in the formation of glass-to-metal seals, and has an additional advantage in that it further increases the resistance of the glass to weathering and chemical attack. The increased resistance to the effect of humidity at all temperatures enables these glasses to be used as insulators for electrical components when sealed to iron-nickel-cobalt alloys of the aforesaid kind, for example, without any danger of loss of efficiency as insulators caused by surface conduction through films of moisture containing dissolved salts derived from the glass, such as is experienced with electrical components using the high boric oxide type of glass as insulators.

The glasses in accordance with the invention are particularly suitable for the fabrication of ware, such as bulbs or tubular components of all sizes for forming parts of the envelopes of electrical devices, for example thermionic valves and semiconductor devices, which parts can readily be sealed directly to envelope parts composed of a metal or alloy of the type specified. For example a tubular seal of any required diameter may be formed by placing the open end of a bulb or tube composed of one of said glasses in contact with a disc or tube of such metal or alloy and heating the contacting parts of the glass and metal components to about 1000° C. by any convenient method. These glasses are also suitable for the fabrication of prismatic lighting ware, for example for use in street lighting fittings and in sealed beam headlights.

The glasses of the invention may furthermore be used to form glass beads for sealing leading-in conductors into apertures in metal parts of the envelopes of electrical devices, the beads being produced in well known manner either by sintering the compressed glass powder or by fusing on to the leading-in wires short lengths of drawn glass tubing fitted over the wires.

The compositions of two specific glasses in accordance with the invention are shown in the following table, in columns B and C, by way of example, together with the composition of a typical high boric oxide glass (column A) which may be used for sealing to alloys of the "Kovar" type, for comparison; the figures quoted in the table represent weight percentages. The mean coefficient of thermal expansion over the temperature range 20° C. to 350° C. ($\alpha$), the Mg point (that is to say, the highest temperature attainable on the thermal expansion-temperature curve, above which temperature the glass softens at a measurable rate under its own weight), and the electrical resistivity in ohm-cm. at 150° C. and 25° C. (indicated as log $10\rho$) of each glass are also indicated in the table.

Table

|  | A | B | C |
|---|---|---|---|
| $SiO_2$ | 66.5 | 65.0 | 66.5 |
| $Al_2O_3$ | 2.0 | 5.7 | 4.0 |
| $B_2O_3$ | 22.5 | 15.8 | 14.0 |
| $Na_2O$ | 4.7 | 4.7 | 4.0 |
| $K_2O$ | 3.5 | 3.2 | 2.5 |
| CaO | } 0.8 | { 0.9 | |
| MgO | | 2.5 | 3.0 |
| BaO | | | 4.5 |
| PbO | | 1.9 | |
| ZnO | | 0.3 | 1.5 |
| $F_2$ | | 5.3 | 5.0 |
| $\alpha \times 10^{-6}$ cm./cm./° C. | 5.0 | 5.3 | 5.0 |
| Mg (° C.) | 525 | 560 | 550 |
| $\log_{10}\rho$ at 150° C | 12.1 | 11.2 | 11.4 |
| $\log_{10}\rho$ at 25° C | 17.9 | 16.8 | 16.5 |

As an example of a method of manufacturing a glass in accordance with the invention, a typical batch of raw materials is prepared by mixing the following ingredients, in the weight proportions stated:

| | Lbs. |
|---|---|
| Sand | 79 |
| Barium carbonate | 6¾ |
| Zinc oxide | 4 |
| Felspar | 70 |
| Sodium nitrate | 2 |
| Dehydrated borax | 22 |
| Boric acid | 36 |
| Sodium silicofluoride | 2 |
| Potassium carbonate | 3½ |

A small amount, for example about 6 ounces, of a fining agent such as arsenious oxide might also be included in the batch.

Approximately half a ton of batch of the above composition is introduced into an open fireclay pot 45 inches in diameter, is heated by either oxy-coal gas burners or fuel oil burners to a temperature of 1430° C. and is maintained at this temperature for 1½ to 2 days. The molten glass is allowed to cool to a convenient working temperature for the fabrication of ware, which is about 1100–1150° C.; cooling from the founding temperature to the working temperature takes about 3–6 hours. The composition of the glass thus produced, allowing for loss by volatilisation of part of the fluorine and oxides of sodium, potassium and boron contained in the initial batch and pick-up of alumina from the wall of the pot, is as follows:

| | Percent by weight |
|---|---|
| $SiO_2$ | 65.5 |
| $Al_2O_3$ | 5.7 |
| $B_2O_3$ | 15.7 |
| $Na_2O$ | 4.4 |
| $K_2O$ | 3.1 |
| ZnO | 2.0 |
| BaO | 2.8 |
| $F_2$ | 0.2 |

The glass may also contain a small proportion of CaO derived from the felspar and possibly traces of other minor impurities from the raw materials, and a small proportion of the fining agent, if used, but these minor additions do not affect the quality or properties of the glass.

If loss by volatilisation proves to be greater or less than expected, the proportions of borax, boric acid, sodium silicofluoride and potassium carbonate included in the batch may be adjusted as required; for example, in various batches which we have employed, the weights of dehydrated borax and boric acid respectively have ranged from 16 to 22 lbs., and from 28 to 42 lbs., the weights of the other ingredients remaining the same as indicated above. Similarly, the amount of sodium silicofluoride used may be varied between 1½ to 2½ lbs, and the amount of potassium carbonate may be varied between 3 to 4 lbs. In addition, the amount of sodium nitrate employed may be varied, for example between about 1½ lbs. and 3 lbs., primarily for the purpose of controlling seed in the glass, although this will of course have some effect on the sodium oxide content of the glass.

The glass produced by the method described above, and also glasses B and C referred to in the above table, are suitable for the fabrication of bulbs and tubes of widely varying sizes, by conventional glass blowing and drawing techniques, and seal directly to iron-nickel-cobalt alloys of the kind hereinbefore mentioned. Hence these glasses can advantageously be used for the manufacture of glass parts of the envelopes of many types of electrical devices, for example transmitting valve envelopes, mercury arc rectifier envelopes, and germanium diode capsules. In addition these glasses may be used, in the form of beads, for sealing conducting wires into apertures in metal components of electrical devices, the beads being formed either from short lengths of drawn tubing, or from sintered glass powder: for example the glasses may be used in this way for sealing rods of an iron-nickel-cobalt alloy of the kind referred to above through the base, composed of a similar alloy, of a quartz crystal holder.

For forming the sintered glass beads, glass powder is produced by pouring the molten glass into water, the coarse powder so formed then being crushed to reduce it to particles capable of passing through a sieve having 40 meshes to the linear inch but retained by a sieve of 200 meshes to the linear inch. This powder is mixed with approximately 5% of its weight of a suitable binder, for example cetyl alcohol in solution in ether, and the mixture is dried and then subjected to a pressure of 4 to 5 tons per square inch in a mould to form beads of the required size and shape having apertures through which the conductors can be inserted. The beads are sintered by heating at 725° C.

For the manufacture of all the above-described types of seal, the glass and metal components are assembled together in the appropriate relative positions and are heated, in the regions adjacent to the required seal, to approximately 1000° C. in known manner, for example but direct flame heating or by the eddy current technique. The seals are annealed at 525° C.

The glasses in accordance with the invention may also be used in the form of loose powder, to form pressed glass components or parts of electrical devices, by means of which metal components of such devices are united together. As an example of such a use, a pressed glass base of an electrical device having a plurality of leading-in-wires, composed of an iron-nickel-cobalt alloy of the kind referred to, passing through the base is made in the following manner: the glass produced by the method described above by way of example, in the form of loose powder produced as described above in connection with the manufacture of sintered glass beads, is placed, without a binder, in a graphite mould of the shape and size of the required base, and the wires are placed in the desired positions, passing through the mass of glass powder, located by apertures in the mould. The mould is subjected to light pressure, while the temperature of the glass therein is raised to 900° C. by eddy current heating. The perimeter of the glass base so produced may be sealed directly to an envelope or canister formed of an iron-nickel-alloy similar to that of which the leading-in wires are composed, by heating to approximately 1000° C. as described above.

This application is a continuation-in-part application of earlier filed application Serial No. 416,394, filed March 15, 1954, and now abandoned, for Glass Compositions and Glass-to-Metal Seals.

There is claimed:

1. A lithia-free glass, suitable for sealing directly to a metal of the class consisting of molybdenum and iron-nickel-cobalt alloys, having a composition essentially consisting of in the range of 64% to 68% silica ($SiO_2$), 3.5% to 6% alumina ($Al_2O_3$), 12% to 16.5% boric oxide ($B_2O_3$), 3% to 5% sodium oxide ($Na_2O$), 2% to 5% potassium oxide ($K_2O$), 0% to 1.5% calcium oxide (CaO), 0% to 2.5% zinc oxide (ZnO), 2.5% to 3.5% barium oxide (BaO), 0% to 7% lead oxide (PbO), and 0.2% to 2% fluorine, the total content of alkali metal oxides ($Na_2O + K_2O$) being from 6% to 8% and the total content of divalent metal oxides being from 4% to 8%.

2. A lithia-free glass having the composition, by weight, which consists of approximately 65% $SiO_2$, 5.7% $Al_2O_3$, 15.8% $B_2O_3$, 4.7% $Na_2O$, 3.2% $K_2O$, 0.9% CaO, 2.5% BaO, 1.9% ZnO and 0.3% fluorine, and of which the coefficient of thermal expansion is $5.3 \times 10^{-6}$ cm./cm./° C. over the temperature range 20° C. to 350° C., the Mg point is 560° C., and the electrical resistivity is $10^{11.2}$ ohm-cm. at 150° C. and $10^{16.8}$ ohm-cm. at 25° C.

3. A lithia-free glass having the composition, by weight, which consists of approximately 66.5% $SiO_2$, 4.0% $Al_2O_3$, 14.0% $B_2O_3$, 4.0% $Na_2O$, 2.5% $K_2O$, 3.0% BaO, 4.5% PbO, 1.5% fluorine, and of which the coefficient of thermal expansion is $5.0 \times 10^{-6}$ cm./cm./° C. over the temperature range 20° C. to 350° C., the Mg point is 550° C., and the electrical resistivity is $10^{11.4}$ ohm.-cm. at 150° C. and $10^{16.5}$ ohm-cm. at 25° C.

4. A lithia-free glass having the composition, by weight, which consists of approximately 65.5% $SiO_2$, 5.7% $Al_2O_3$, 15.7% $B_2O_3$, 4.4% $Na_2O$, 3.1% $K_2O$, 2.0% ZnO, 2.8% BaO and 0.2% $F_2$.

5. A glass-to-metal seal consisting of a glass according to claim 1 sealed directly to an alloy having a non-linear thermal expansion characteristic in the temperature range 20° C. to 550° C. such that over the temperature ranges 20° C. to 350° C., 20° C. to 450° C., 20° C. to 500° C. and 20° C. to 550° C., respectively, the mean coefficients of thermal expansion are approximately 4.8, 5.3, 6.2, and $7.1 \times 10^{-6}$ cm./cm./° C.

6. A glass-to-metal seal consisting of a glass according to claim 1 sealed directly to a metal having a linear thermal expansion characteristic in the temperature range 20° C. to 550° C. such that the mean coefficient of thermal expansion over this range is in the range 5.3 to $5.7 \times 10^{-6}$ cm./cm./° C.

References Cited in the file of this patent

UNITED STATES PATENTS

| | | |
|---|---|---|
| 2,062,335 | Scott | Dec. 1, 1936 |
| 2,068,801 | Hood | Jan. 26, 1937 |
| 2,520,663 | Tromp | Aug. 29, 1950 |
| 2,756,158 | Hahn et al. | July 24, 1956 |

OTHER REFERENCES

Glastechnische Tabellen, Eitel-Pirani-Scheel, 1932 ed., pages 689 and 691.